(12) United States Patent
Porter et al.

(10) Patent No.: US 10,934,694 B1
(45) Date of Patent: Mar. 2, 2021

(54) WALL MOUNTING SYSTEMS AND METHODS

(71) Applicant: Haws Corporation, Sparks, NV (US)

(72) Inventors: Dean Porter, Reno, NV (US); Joshua Linn, Carson City, NV (US)

(73) Assignee: Haws Corporation, Sparks, NV (US)

( * ) Notice: Subject to any disclaimer, the term of this patent is extended or adjusted under 35 U.S.C. 154(b) by 7 days.

(21) Appl. No.: 16/374,884

(22) Filed: Apr. 4, 2019

Related U.S. Application Data

(60) Provisional application No. 62/652,758, filed on Apr. 4, 2018.

(51) Int. Cl.
| | |
|---|---|
| *F16M 13/02* | (2006.01) |
| *F16F 15/04* | (2006.01) |
| *E03B 9/20* | (2006.01) |
| *F16M 11/10* | (2006.01) |
| *E03C 1/05* | (2006.01) |
| *E03C 1/32* | (2006.01) |
| *B67D 3/00* | (2006.01) |

(52) U.S. Cl.
CPC ............... *E03B 9/20* (2013.01); *B67D 3/008* (2013.01); *B67D 3/0029* (2013.01); *E03C 1/32* (2013.01); *F16M 13/02* (2013.01)

(58) Field of Classification Search
CPC ........ F16M 13/02; E03B 9/20; B67D 3/0029; B67D 3/008; E03C 1/32
See application file for complete search history.

(56) References Cited

U.S. PATENT DOCUMENTS

| | | | |
|---|---|---|---|
| 3,307,522 A * | 3/1967 | Hilario ................. | A01K 39/022 119/81 |
| 10,670,333 B2 * | 6/2020 | Nanos ..................... | F25D 19/00 |
| 2005/0236543 A1 * | 10/2005 | O'Neil ............... | F16M 11/2014 248/286.1 |
| 2006/0263188 A1 * | 11/2006 | Goldin ................. | B67D 3/0029 414/598 |
| 2011/0174939 A1 * | 7/2011 | Taylor .................... | F16M 11/10 248/201 |

* cited by examiner

*Primary Examiner* — Tan Le
(74) *Attorney, Agent, or Firm* — Cesari and McKenna, LLP

(57) ABSTRACT

A wall mounting system is described having a wall mounting bracket to be rigidly secured to a wall, a pair of water bottle filling station-mounted brackets to be rigidly secured to a water bottle filling station, and a pair of bracket adaptors, each configured to be secured to a respective one of the water bottle filling station-mounted brackets and to the wall mounting bracket. The system can include one or more springs. The system allows an operator to properly install a water bottle filling station on uneven walls or damaged or improperly installed wall mounting brackets.

7 Claims, 13 Drawing Sheets

WALL MOUNTING SYSTEMS AND METHODS

CROSS-REFERENCE TO RELATED APPLICATION

This application is based upon and claims priority to U.S. provisional patent application 62/652,758, entitled "Wall Mounting Systems and Methods," filed Apr. 4, 2018; the entire content of which application is incorporated herein by reference.

BACKGROUND

Technical Field

This disclosure relates to systems and methods for mounting objects to walls, and more specifically to systems and methods for mounting drinking fountains and water bottle filling stations to walls.

Description of Related Art

A wide variety of objects are often mounted to vertical walls. As examples, drinking fountains and water bottle filling stations are often mounted to pre-built walls, such as on one or more brackets. If a wall to which such objects are to be mounted is not perfectly built, however, or if mounting brackets attached to the wall are not perfectly installed, then mounting such objects flush against the wall can be difficult. Further, if the wall or brackets are damaged, such as by vandalism, then a previously-installed object is often removed from the wall to facilitate repairs and then re-installed.

SUMMARY

A bracket assembly for mounting an object on or to a wall may be summarized as including: a first bracket configured to be rigidly secured directly to the wall; and a bracket adaptor mechanically coupled to the object such that the bracket adaptor can translate with respect to the object, the bracket adaptor configured to engage with the first bracket to secure the object to the wall and allow the object to move with respect to the first bracket. The object may be a water bottle filling station.

The bracket assembly may further include: a second bracket configured to be rigidly secured directly to the object; wherein the bracket adaptor is mechanically coupled to the second bracket such that the bracket adaptor can translate with respect to the second bracket, the bracket adaptor configured to engage with the first bracket to allow the second bracket to move with respect to the first bracket.

The bracket assembly may further include: a bias member or bias means, e.g., a coil spring having a first end engaged with a surface of the bracket adaptor and a second end engaged with a surface of the second bracket. The second bracket may include an aperture and the bracket adaptor may include a rod that extends through the aperture. The coil spring may extend about the rod.

The first bracket may include a horizontally-extending panel and an arm that extends vertically above the panel. The arm may include a rearward-facing edge that extends upward and forward at a first oblique angle to vertical.

The bracket adaptor may include a forward-facing front surface that extends upward and forward at a second oblique angle to vertical. The first oblique angle may be the same as the second oblique angle and the forward-facing front surface of the bracket adaptor may engage with the rearward-facing edge of the arm of the first bracket when the first bracket is engaged with the bracket adaptor.

A bracket assembly for mounting an object on a wall may be summarized as including: a first bracket configured to be rigidly secured directly to the wall; and a bracket adaptor mechanically coupled to the first bracket such that the bracket adaptor can translate with respect to the first bracket, the object configured to engage with the bracket adaptor to secure the object to the wall and allow the object to move with respect to the first bracket.

The bracket assembly may further include: a second bracket configured to be rigidly secured directly to the object; wherein the second bracket is configured to engage with the bracket adaptor to secure the object to the wall and allow the second bracket to move with respect to the first bracket.

A method of mounting an object on a wall may be summarized as including: rigidly fastening a first bracket to the wall; rigidly fastening a second bracket to the object; and mechanically engaging a bracket adaptor with the first bracket and with the second bracket so that the object is secured to the wall, so that the first bracket can move with respect to the bracket adaptor, and so that the second bracket can move with respect to the bracket adaptor.

Mechanically engaging the bracket adaptor with the first and second brackets may include positioning the object such that a rear surface of the object is flush against the wall. The method may further include: after mechanically engaging the bracket adaptor with the first and second brackets, moving the object with respect to the wall, thereby moving the bracket adaptor with respect to the first bracket. The method may further include: after mechanically engaging the bracket adaptor with the first and second brackets, moving the object with respect to the wall, thereby moving the second bracket with respect to the bracket adaptor. Mounting of the object on the wall may be completed without any fasteners or fastener covers being visible from an exterior of the mounted object.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
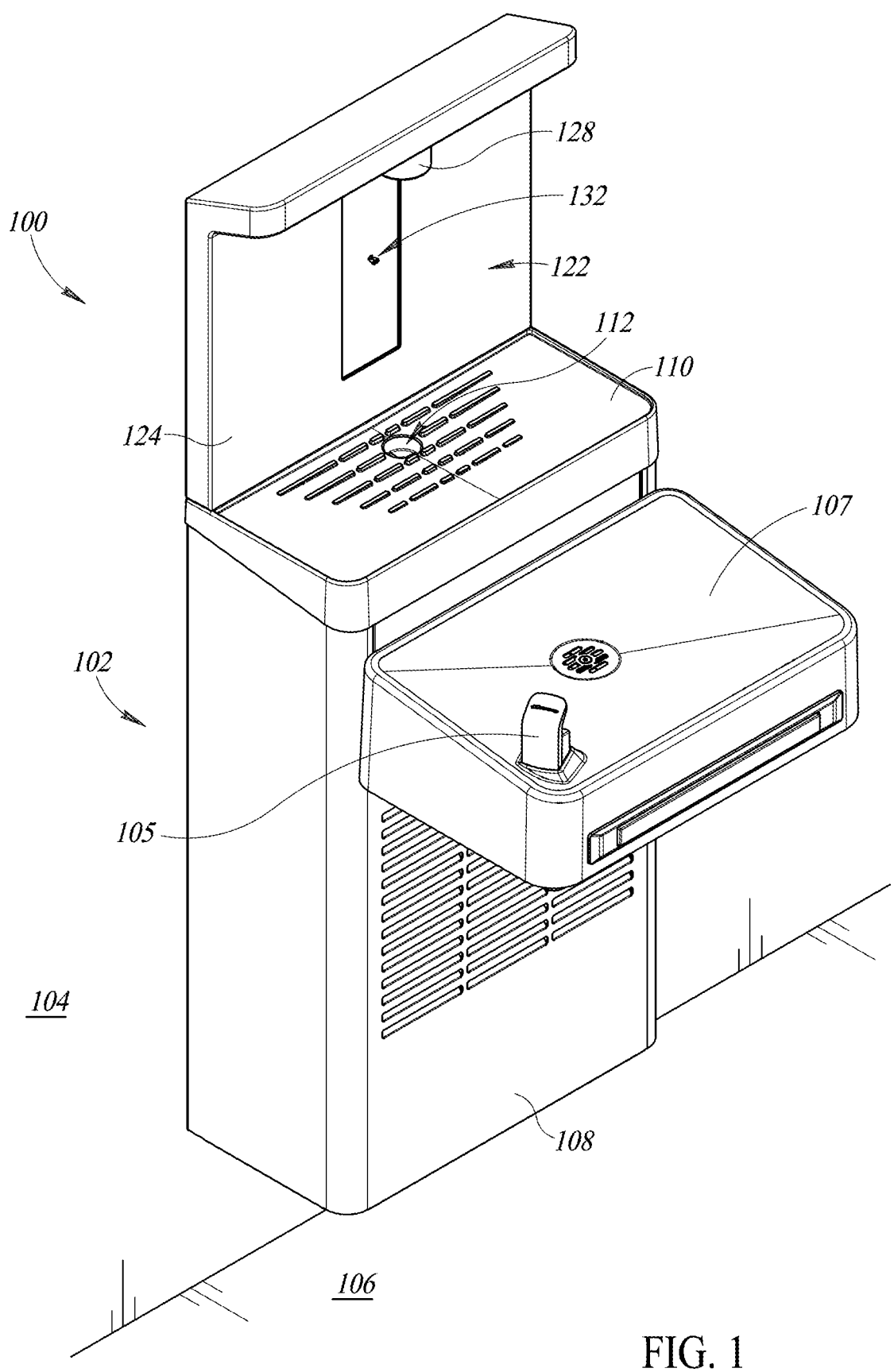
FIG. 1 is a front, top, perspective view of a water bottle filling station mounted to a wall and to a water cooler, according to at least one illustrated implementation.
Figure 2:
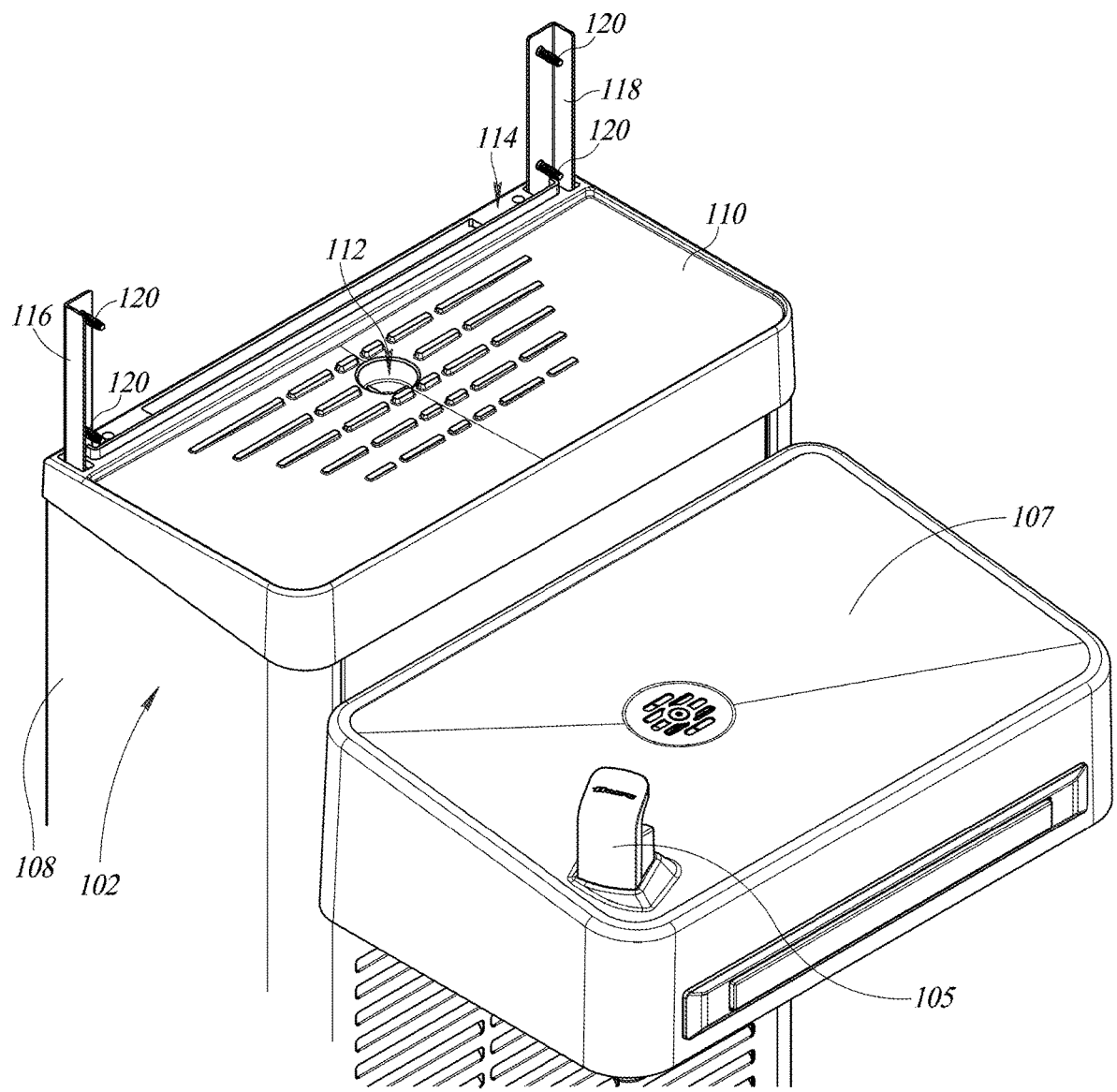
FIG. 2 is a front, top, perspective view of the water cooler of FIG. 1, according to at least one illustrated implementation.

FIG. 1 illustrates a perspective view of a water bottle filling station 100, which is mounted on top of a water cooler 102, and which is also mounted to a surface of a vertical wall 104 above a ground surface 106. FIG. 2 illustrates a perspective view of a top end of the water cooler 102 with the water bottle filling station 100, except for a pair of brackets 116 and 118 thereof, removed. As illustrated in FIG. 2, the water cooler 102 includes a lower body or frame surrounded by and hidden within a cover or skirt 108, and a top, upper surface 110 with an opening or aperture 112 at a center portion thereof. The upper surface 110 is sloped so that any water thereon drains toward the aperture 112, and a rear portion 114 of the upper surface 11 is configured to engage with a bottom end of the water bottle filling station 100. As also illustrated in FIGS. 1 and 2, the water cooler 102 is coupled to a drinking fountain bubbler 105 and a bowl 107 for the drinking fountain bubbler 105.

The water cooler 102 is also shown in FIG. 2 coupled to a first mounting bracket 116 extending vertically out of a rear, left corner of its upper surface no and a second mounting bracket 118 extending vertically out of a rear, right corner of its upper surface 110. Each of these two mounting brackets 116, 118 has a pair of apertures extending front-to-back therethrough (through it), and a respective pair of screws or bolts 120, which may or may not be self-tapping, extending through the respective apertures. The bolts 120 are used to fasten the brackets 116 and 118 to a rear surface of the water bottle filling station 100, as described further below. In practice, the brackets 116 and 118 are fastened to the rear surface of the water bottle filling station 100 prior to being fastened to the water cooler 102, and the brackets 116 and 118 are shown fastened to the water cooler 102 without the water bottle filling station 100 in FIG. 2 for illustrative purposes.

Figure 3:
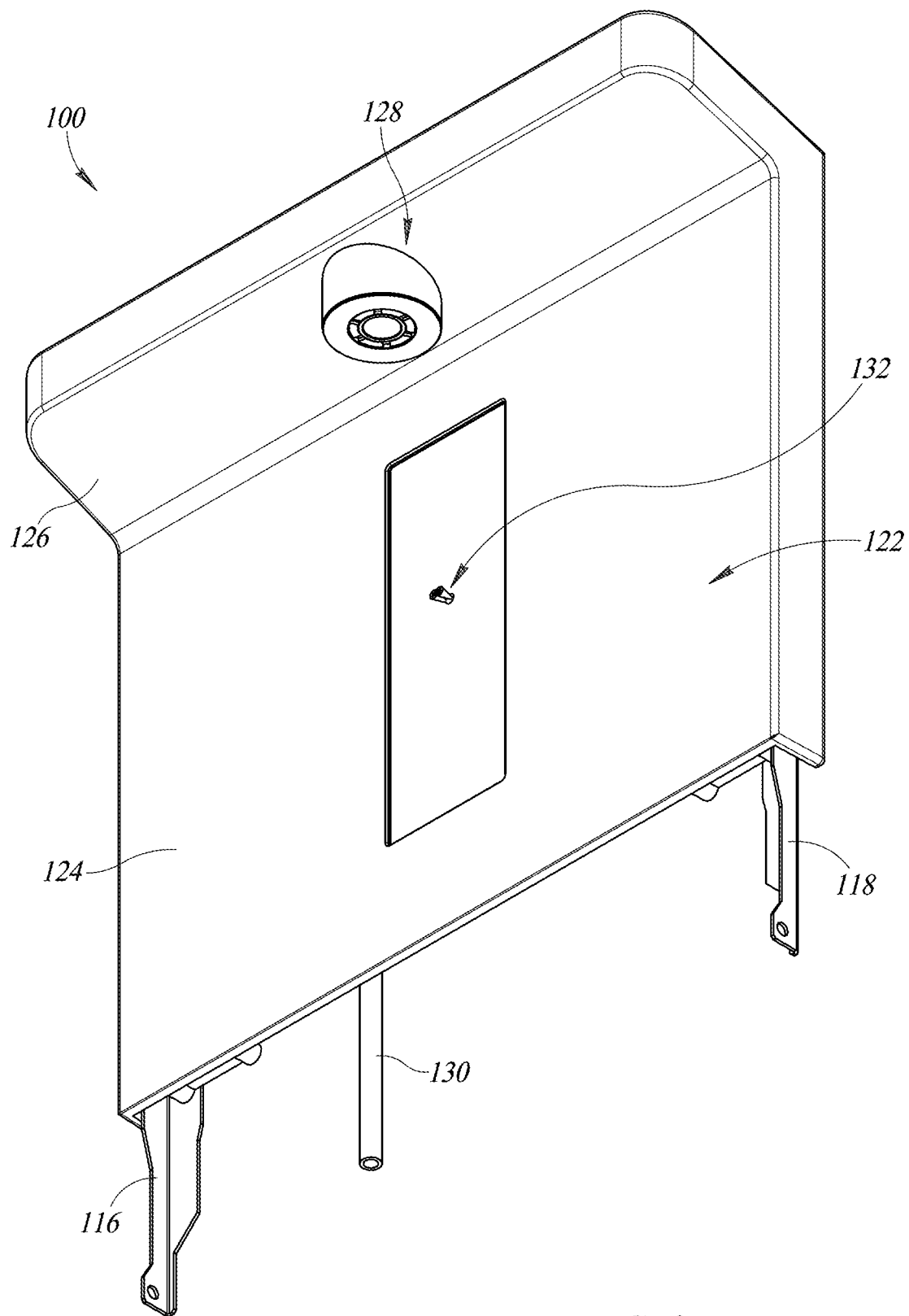
FIG. 3 is a front, bottom, perspective view of the water bottle filling station without the water cooler of FIG. 1, according to at least one illustrated implementation.

FIG. 3 illustrates a perspective view of the water bottle filling station 100 with the water cooler 102 removed. As illustrated in FIG. 3, the water bottle filling station 100 includes a faceplate 122 that has a first, vertical portion 124 and a second, overhanging flange portion 126 that extends forward from a top end of the vertical portion 124. The faceplate 122 can be made from any suitable material, with an injection molded polymer being one specific example. The flange portion 126 includes a spout or outlet 128 extending downward from an underside thereof, from which water can be dispensed to allow a user to fill a water bottle. The spout 128 is positioned directly above the aperture 112 so that water dispensed from the spout 128 that misses a user's water bottle falls directly into the aperture 112. The water bottle filling station 100 also includes the brackets 116 and 118, a tube, conduit, or pipe 130 that carries water from the water cooler 102 to the spout 128, and a sensor 132 that detects the presence of a water bottle to be filled by the water bottle filling station 100.

As used herein, words such as "front," "forward," and other similar terminology refer to a feature being located away from or far from the wall 104, while words such as "back," "rearward," "behind," and other similar terminology refer to a feature being located toward or near the wall 104. Thus, a viewer sees the front of the water bottle filling station 100 and the front of the water cooler 102 when standing opposite the wall 104 across the filling station 100 and water cooler 102 and facing toward the wall 104. As used herein, terms such as "right" and "left" refer to locations as viewed toward the wall 104. As used herein, terms of relative elevation, such as "top," "bottom," "upper," lower," "above," "below," "up," and "down," are used in their ordinary sense, that is, with respect to a direction of a gravitational force, such that liquids are drawn by gravity to flow from a first location toward a second location below the first location.

Figure 4:
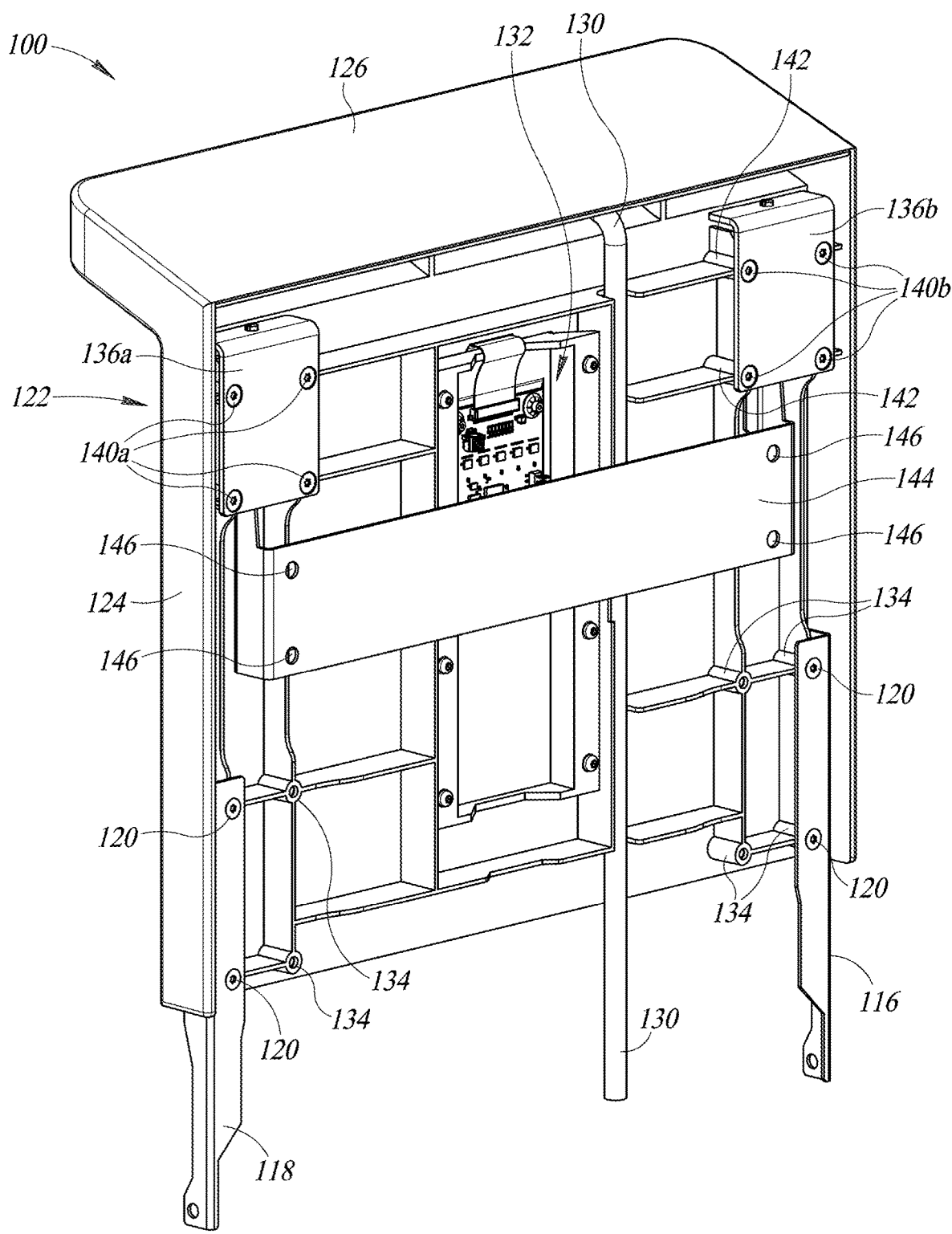
FIG. 4 is a rear, top, perspective view of the water bottle filling station without the water cooler of FIG. 1, according to at least one illustrated implementation.
Figure 5:
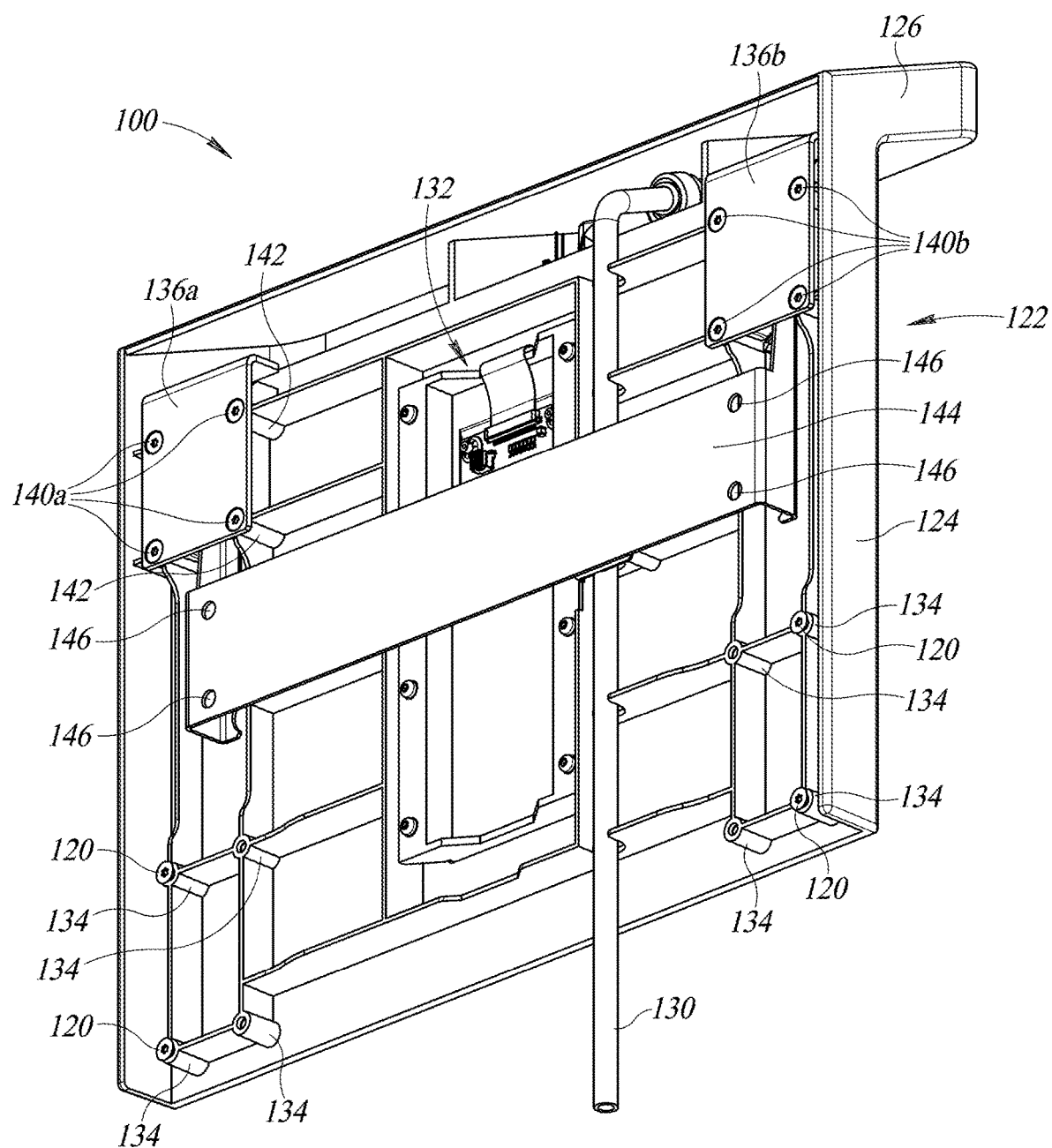
FIG. 5 is a rear, bottom, perspective view of the water bottle filling station without the water cooler of FIG. 1 and a pair of brackets illustrated in FIGS. 3 and 4, according to at least one illustrated implementation.

FIGS. 4 and 5 illustrate rear views of the water bottle filling station 100. As illustrated in FIGS. 4 and 5, a rear surface of the faceplate 122 of the water bottle filling station 100 includes a plurality of screw bosses 134, which may or may not be pre-threaded, and which are configured to receive respective ones of the bolts 120. Thus, by screwing the bolts 120 through the apertures in the mounting brackets 116 and 118 and into the screw bosses 134, and then fastening the brackets 116 and 118 to the water cooler 102, the water bottle filling station 100 can be mounted and secured to the brackets 116 and 118 and thereby to the water cooler 102.

As also illustrated in FIGS. 4 and 5, the water bottle filling station 100 includes a first water bottle filling station-mounted mounting bracket 136a located at an upper right hand corner thereof and a second water bottle filling station-mounted mounting bracket 136b located at an upper left hand corner thereof. The mounting brackets 136a, 136b can be manufactured from sheet metal. Each of these two mounting brackets 136a, 136b has a set of four apertures 138a, 138b (see FIG. 11) extending front-to-back therethrough, and a respective set of four screws or bolts 140a, 140b, which may or may not be self-tapping, extending through the respective apertures. The bolts 140a, 140b are used to rigidly mechanically fasten and secure the brackets 136a, 136b to the rear surface of the faceplate 122 of the water bottle filling station 100. For example, by screwing the bolts 140a, 140b through the apertures 138a, 138b in the mounting brackets 136a, 136b and into screw bosses 142, which may or may not be pre-threaded (see FIGS. 14 and 15), and which are formed in the rear surface of the faceplate 122 and configured to receive respective ones of the bolts 140a, 140b, the faceplate 122 can be mounted and secured to the brackets 136a, 136b.

As also illustrated in FIGS. 4 and 5, the water bottle filling station 100 includes a wall mounting bracket 144 extending between the first mounting bracket 136a at the upper right hand corner thereof and the second mounting bracket 136b at the upper left hand corner thereof. The wall mounting bracket 144 can be manufactured from sheet metal. The wall mounting bracket 144 has a set of four apertures 146 extending front-to-back therethrough, and a respective set of four screws or bolts, which may or may not be self-tapping, can extend through the respective apertures. Such bolts can be used to rigidly mechanically fasten and secure the bracket 144 to the wall 104. For example, by screwing the bolts through the apertures 146 in the wall mounting bracket 144 and into the wall 104, the wall mounting bracket 144 can be mounted and secured to the wall 104.

Figure 6:
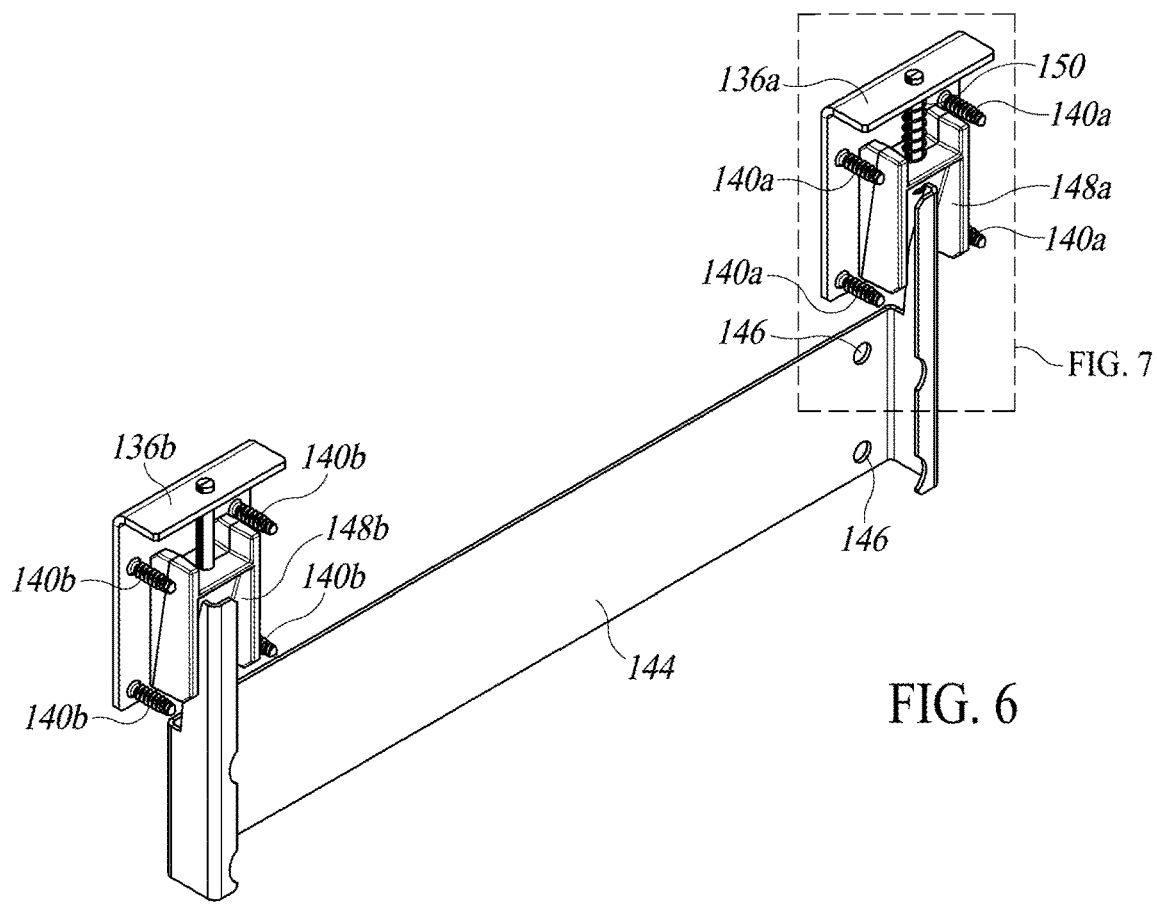
FIG. 6 is a front, top, perspective view of a bracket assembly of the water bottle filling station of FIG. 1, according to at least one illustrated implementation.
Figure 7:
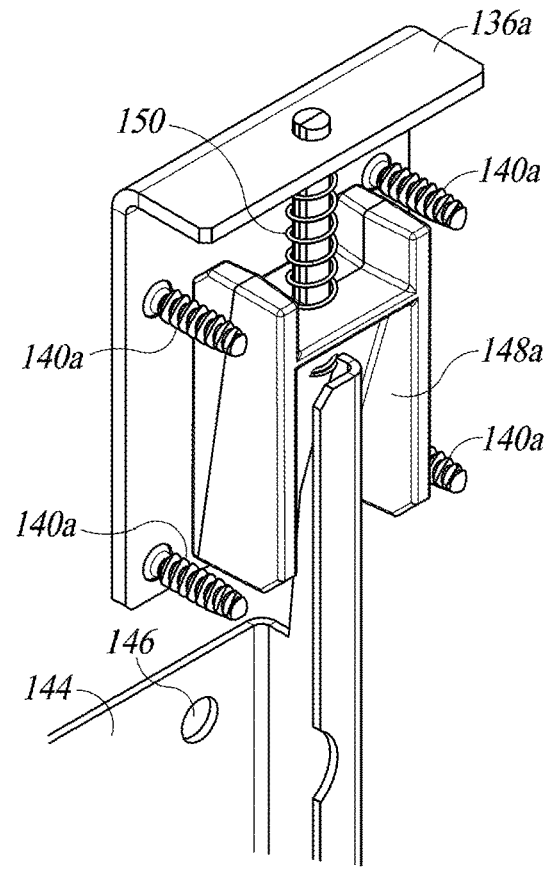
FIG. 7 is a close-up view of a portion of the bracket assembly illustrated in FIG. 6, according to at least one illustrated implementation.
Figure 8:
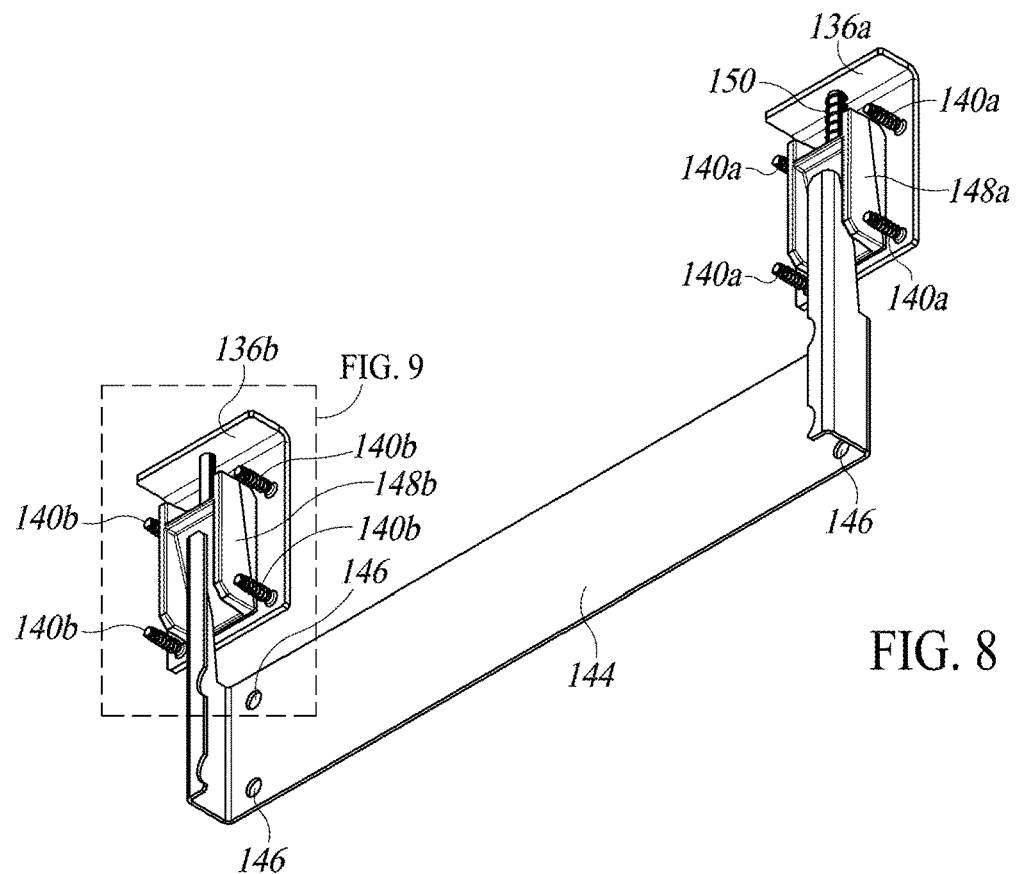
FIG. 8 is a front, bottom, perspective view of the bracket assembly of the water bottle filling station of FIG. 1, according to at least one illustrated implementation.
Figure 9:
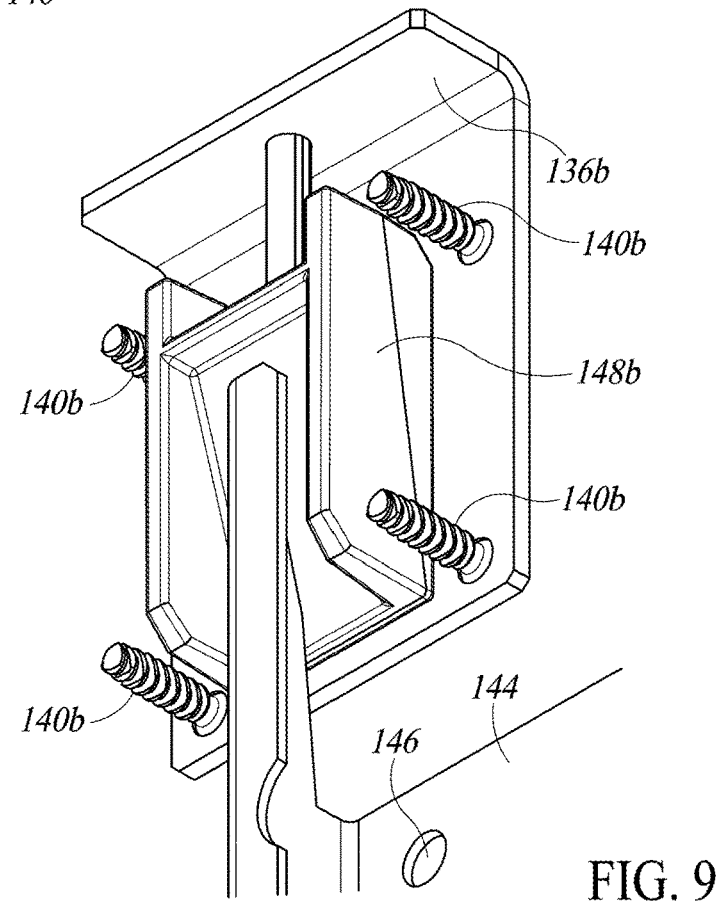
FIG. 9 is a close-up view of a portion of the bracket assembly illustrated in FIG. 8, according to at least one illustrated implementation.

FIGS. 6 and 8 illustrate front views of a bracket assembly including the first and second mounting brackets 136a, 136b, the wall mounting bracket 144, a first bracket adaptor 148a that mates the first mounting bracket 136a to the wall mounting bracket 144, and a second bracket adaptor 148b that mates the second mounting bracket 136b to the wall mounting bracket 144, with the rest of the components of the water bottle filling station 100 removed for improved clarity of the bracket assembly. The bracket adaptors 148a, 148b can be made by any suitable processes, with machining and die-casting being two specific examples. FIGS. 7 and 9 illustrate close-up views of portions of FIGS. 6 and 8, respectively.

FIGS. 6-9 illustrate that the water bottle filling station 100 also includes a bias member or bias means 150, e.g., a coil spring 150, having a first end positioned to interact with a surface of the first mounting bracket 136a and a second end positioned to interact with a surface of the wall mounting bracket 144, but does not include a complementary second spring positioned to interact with the second mounting bracket 136b and the wall mounting bracket 144. In one alternative implementation, the water bottle filling station 100 can include a spring having a first end positioned to interact with a surface of the second mounting bracket 136b and a second end positioned to interact with a surface of the wall mounting bracket 144, but not include a complementary second spring positioned to interact with the first mounting bracket 136a and the wall mounting bracket 144. In another alternative implementation, the water bottle filling station 100 includes a first coil spring 150 having a first end positioned to interact with a surface of the first mounting bracket 136a and a second end positioned to interact with a surface of the wall mounting bracket 144, and a second coil spring having a first end positioned to interact with a surface of the second mounting bracket 136b and a second end positioned to interact with a surface of the wall mounting bracket 144. In one other implementation, the water bottle filling station 100 includes neither a spring positioned to interact with the first mounting bracket 136a nor a spring positioned to interact with the second mounting bracket 136b.

Figure 10:
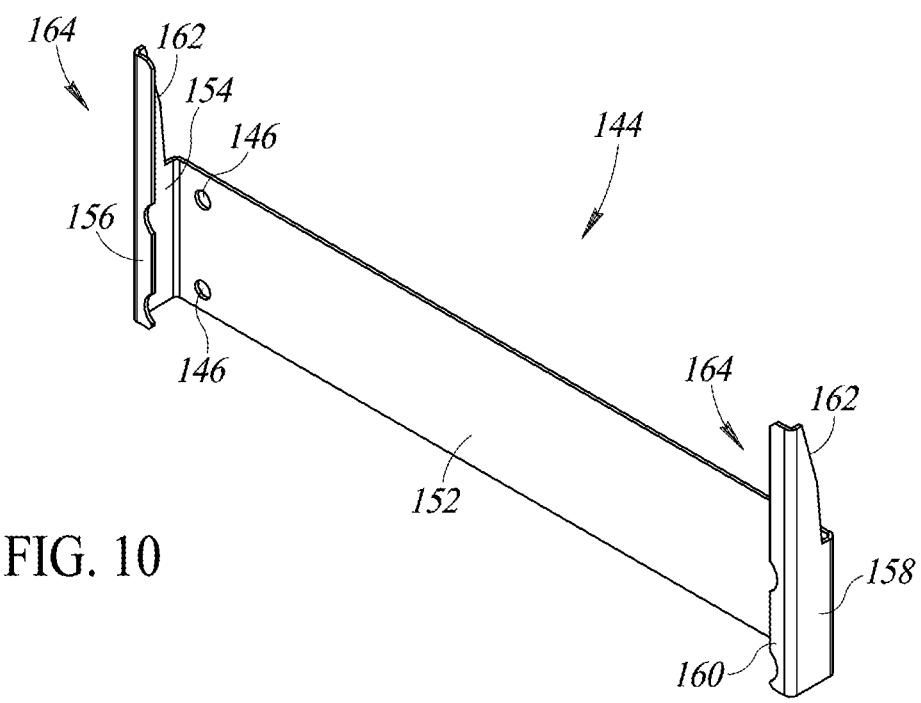
FIG. 10 illustrates a wall-mounted bracket of the bracket assembly illustrated in FIGS. 6 and 8, according to at least one illustrated implementation.

FIG. 1 illustrates a front perspective view of the wall mounting bracket 144. As illustrated in FIG. 10, the wall mounting bracket 144 includes an elongate horizontally-extending web or panel 152, which is configured to be positioned flush against the wall 104 and which includes the four apertures 146. The wall mounting bracket 144 also includes a first flange 154 that extends forward away from a left end of the panel 152, and a second flange 156 that extends rightward away from a front end of the first flange 154. Similarly, the wall mounting bracket 144 also includes a third flange 158 that extends forward away from a right end of the panel 152, and a fourth flange 160 that extends leftward away from a front end of the third flange 158. The first and third flanges 154 and 158 also extend upward away from and above the top of the panel 152, thereby forming protrusions or arms 164. Rearward-facing edges 162 of the arms 164 extend upward and forward at an oblique angle to vertical, with bottom or lower portions of the rearward-facing edges 162 oriented at a smaller angle to vertical (i.e., closer to vertical) than top or upper portions of the rearward-facing edges 162. Thus, a length of the arms 164 front-to-back tapers as the arms 164 extend upward.

Figure 11:
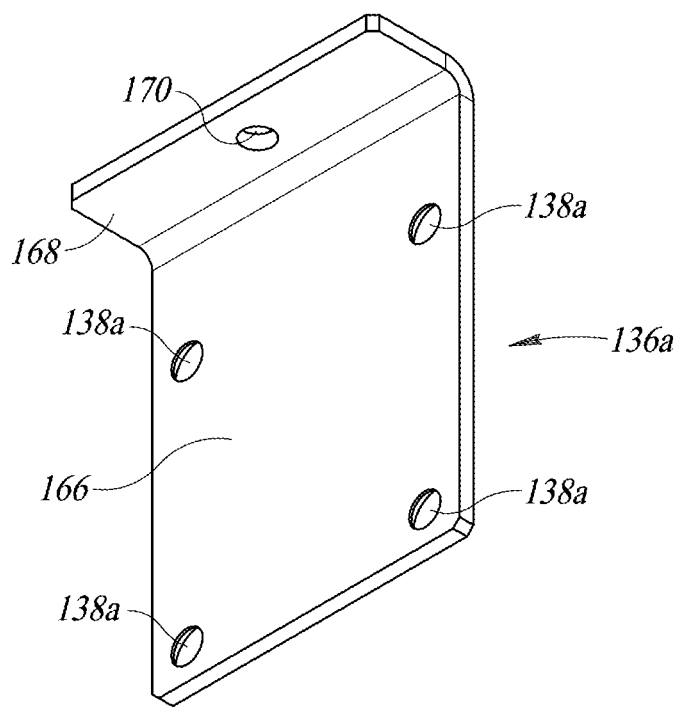
FIG. 11 illustrates a water bottle filling station-mounted bracket of the bracket assembly illustrated in FIGS. 6 and 8, according to at least one illustrated implementation.

FIG. 11 illustrates a front perspective view of the mounting bracket 136a. The mounting bracket 136b can be the same as or identical to, or have the same or similar features as, the mounting bracket 136a. As illustrated in FIG. 11, the mounting bracket 136a includes a web, or a primary panel or main body 166, which is configured to be rigidly coupled to the faceplate 122, and which includes the four apertures 138a. The mounting bracket 136a also includes a flange 168 that extends forward away from a top end of the main body 166. The flange 168 includes an aperture 170 that extends up-and-down therethrough at, e.g., a center thereof.

Figure 12:
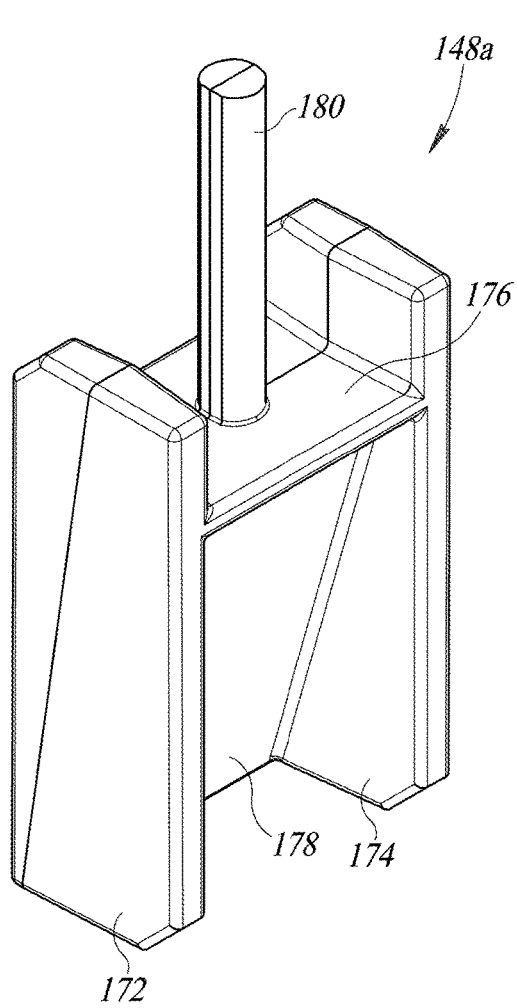
FIGS. 12 and 13 illustrate different perspective views of a bracket adaptor of the bracket assembly illustrated in FIGS. 6 and 8, according to at least one illustrated implementation.
Figure 13:
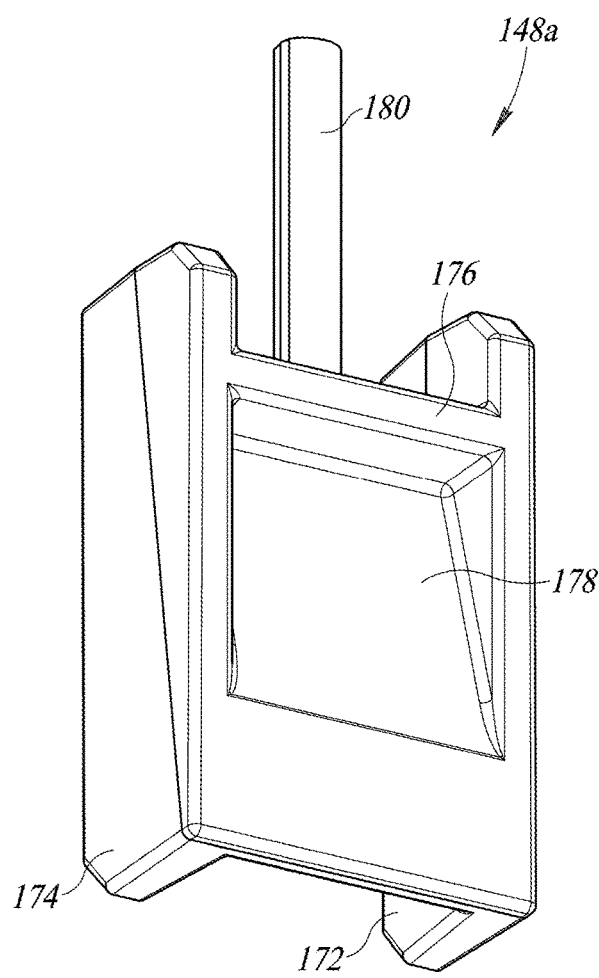

FIGS. 12 and 13 illustrate front and rear perspective views, respectively, of the first bracket adaptor 148a. The second bracket adaptor 148b can be the same as or identical to, or have the same or similar features as, the first bracket adaptor 148a. As illustrated in FIGS. 12 and 13, the bracket adaptor 148a includes a left vertical sidewall 172, a right vertical sidewall 174, a horizontal upper wall 176 that extends between the two sidewalls 172 and 174 and from the front to the back of the bracket adaptor 148a, and a central wall 178 that extends from an inner surface of the left sidewall 172 to an inner surface of the right sidewall 174, from a bottom of the bracket adaptor 148a to a bottom surface of the upper wall 176, and from the back of the bracket adaptor 148a toward the front of the bracket adaptor 148a. Thus, the central wall 178 has a forward-facing front surface (FFFS) that extends at an oblique angle to vertical as it extends upwards and forwards between the two vertical sidewalls 172 and 174. The oblique angle at which the front surface of the central wall 178 extends with respect to vertical matches or is the same as or similar to the oblique angle at which the top or upper portions of the rearward-facing edges (RFE) 162 of the arms 164 extend with respect to vertical, allowing the upper portions of the rearward-facing edges RFE 162 to engage and mate with the forward-facing front surfaces FFFS of the central walls 178 of the respective bracket adaptors 148a or 148b, as described in further detail below.

As also illustrated in FIGS. 12 and 13, the bracket adaptor 148a also includes a cylindrical shaft or rod 180 that extends upward out of and away from a top surface of the upper wall 176. The rod 180 can have a diameter matching, corresponding to, similar or approximately equal to, or slightly less than, a diameter of the aperture 170 extending through the flange 168 of the first mounting bracket 136a, so that the rod 180 can be positioned to extend through and to move up and down with respect to the aperture 170. The rod 180 can be machined or die-cast with the rest of the bracket adaptor 148a, or can be fabricated separately as an individual dowel and then pressed-in to the rest of the bracket adaptor 148a. As illustrated in FIGS. 12 and 13, the two vertical sidewalls 172 and 174 extend upward beyond the top surface of the upper wall 176, such as by a distance that is greater than a solid height of a spring mounted on the rod 180, so that the top ends of the sidewalls 172 and 174 limit travel of the bracket adaptor 148a upward before the spring is compressed to its solid height. A distance between the two vertical sidewalls 172 and 174 can be greater than a corresponding dimension of the arms 164 to be situated between the sidewalls 172 and 174, to allow the arms 164 to be adjusted back and forth between the two sidewalls 172 and 174.

Figure 14:
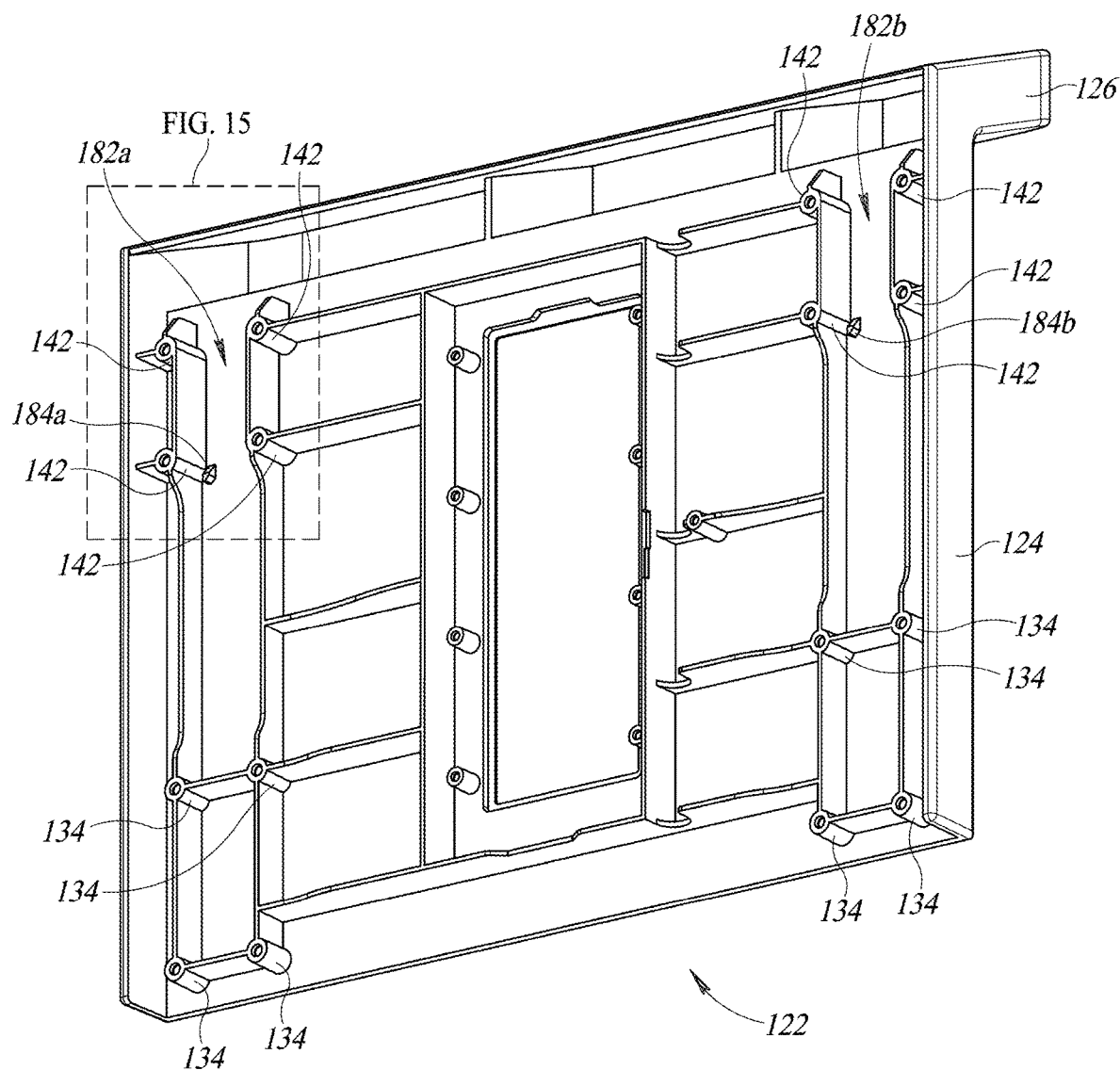
FIG. 14 illustrates a rear view of a faceplate of the water bottle filling station of FIG. 1, according to at least one illustrated implementation.
Figure 15:
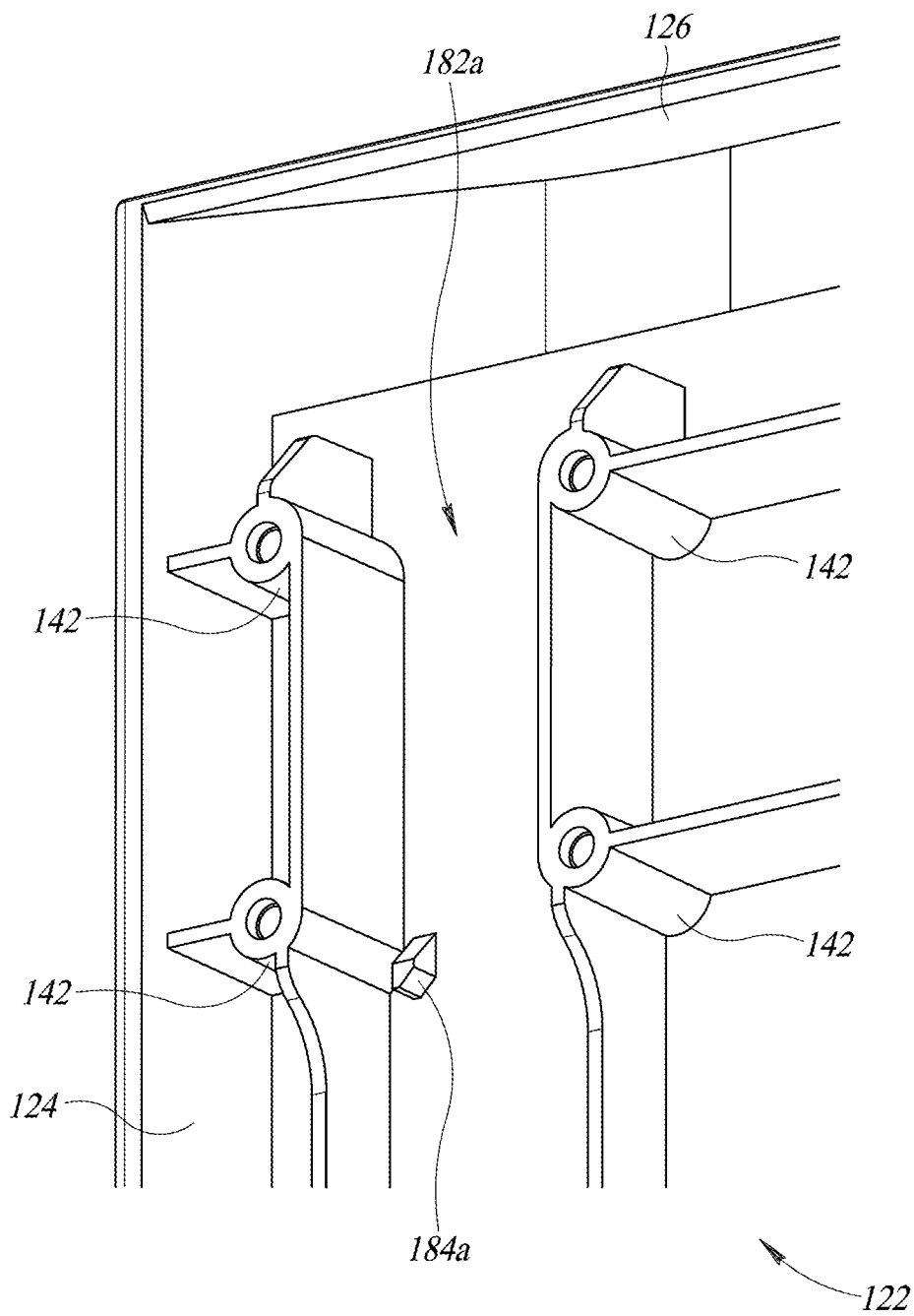
FIG. 15 is a close-up view of a portion of the faceplate illustrated in FIG. 14, according to at least one illustrated implementation.

FIG. 14 illustrates a rear perspective view of the faceplate 122 of the water bottle filling station 100, and FIG. 15 illustrates a close-up view of a portion thereof. As illustrated in FIGS. 14 and 15, the rear surface of the faceplate 122 includes a first vertical channel 182a at a top, right hand corner thereof, into which the flanges 158 and 160 and the arm 164 at the right end of the wall mounting bracket 144, as well as the first bracket adaptor 148a, can be installed and seated. The rear surface of the faceplate 122 also includes two first protrusions or knobs 184a (one is shown in FIGS. 14 and 15) that extend rearward into the first vertical channel 182a. Similarly, the rear surface of the faceplate 122 includes a second vertical channel 182b at a top, left hand corner thereof, into which the flanges 154 and 156 and the arm 164 at the left end of the wall mounting bracket 144, as well as the second bracket adaptor 148b, can be installed and seated. The rear surface of the faceplate 122 also includes two second protrusions or knobs 184b (one is shown in FIGS. 14 and 15) that extend rearward into the second vertical channel 182b.

To install and use the water bottle filling station 100 and the water cooler 102, a suitable location having an open space against the wall 104 can be located. The water cooler 102 can then be positioned and installed within the open space at a height of at least nine inches above the floor 106 with its back against the wall 104. The wall mounting bracket 144 can then be fastened to the wall 104 above the water cooler 102, by threading bolts from front to back through the openings 146 in the wall mounting bracket 144 and into the wall 104. Notably, the present systems and methods facilitate proper positioning and installation of the water bottle filling station 100 even when the wall mounting bracket 144 is imprecisely or inaccurately fastened to the wall, in position and/or orientation, such as with respect to a position and/or an orientation of the water cooler 102. Such imprecisions or inaccuracies can result, for example, from the use of uneven wall surfaces, errors in installation, or damage, such as to the wall bracket 144, due to vandalism.

As examples, the systems and methods described herein can be used to properly install the water bottle filling station 100 even when the wall mounting bracket 144 is installed, e.g., up to 1/8", 1/4", 3/8", 1/2", 5/8", 3/4", 7/8", or 1" (or SI equivalent dimensions) out of position left-to-right with respect to the water cooler 102, up to 1/8", 1/4", 3/8", 1/2", 5/8", 3/4", 7/8", 1", 1 1/8", 1 1/4", 1 3/8", or 1 1/2" (or SI equivalent dimensions) out of position front-to-back with respect to the water cooler 102, and/or up to 1/8", 1/4", 3/8", 1/2", 5/8", 3/4" 7/8" 1", 1 1/8", 1 1/4", 1 3/8", or 1 1/2" (or SI equivalent dimensions) out of position up-and-down with respect to the water cooler 102. Further, the systems and methods described herein can be used to properly install the water bottle filling station 100 even when the wall mounting bracket 144 is installed up to, e.g., 1.0°, 2.0°, 3.0, 4.0°, 5.0°, 6.0°, 7.0°, 8.0°, 9.0°, 10.0°, 11.0°, or 12.0° (possibly including fractional values, i.e., minutes and/or seconds, of such angular values) out of orientation with respect to the water cooler 102 about an axis extending left-to-right, up to, e.g., 1.0°, 2.0°, 3.0°, 4.0°, 5.0, 6.0°, 7.0°, 8.0°, 9.0°, 10.0°, 11.0°, or 12.0° (possibly including fractional values, i.e., minutes and/or seconds, of such angular values) out of orientation with respect to the water cooler 102 about an axis extending front-to-back, and/or up to, e.g., 1.0°, 2.0°, 3.0°, 4.0°, 5.0°, 6.0°, 7.0°, 8.0°, 9.0, 10.0°, 11.0°, or 12.0° (possibly including fractional values, i.e., minutes and/or seconds, of such angular values) out of orientation with respect to the water cooler 102 about an axis extending up-and-down. Of course, it will be appreciated that embodiments of the systems and methods described herein can be used to properly install the water bottle filling station 100—or similar stations and/or apparatus-over ranges (including any possible subranges) of the values (e.g., linear and angular dimensions) provided herein and not just for the discrete exemplary values that have been provided.

The other components of the water bottle filling station 100 can be assembled, or can be provided in a pre-assembled configuration. In either case, the first bracket adaptor 148a is positioned within the first vertical channel 182a in the rear surface of the faceplate 122 such that a bottom surface of the first bracket adaptor 148a is in contact with upper surfaces of the two first knobs 184a, such that the first knobs 184a prevent the first bracket adaptor 148a from moving further downward through the channel 182a with respect to the faceplate 122. A spring (and/or other bias means) may be positioned on and about the rod 180 of the bracket adaptor 148a. The first mounting bracket 136a is positioned so that the rod 180 of the bracket adaptor 148a extends through its aperture 170 and the first mounting bracket 136a is then fastened to the rear surface of the faceplate 122 by positioning bolts through the apertures 138a and screwing the bolts into the screw bosses 142, thereby trapping the bracket adaptor 148a between the faceplate 122, its knobs 184a, and the mounting bracket 136a.

Similarly, the second bracket adaptor 148b is positioned within the second vertical channel 182b in the rear surface of the faceplate 122 such that a bottom surface of the second bracket adaptor 148b is in contact with upper surfaces of the second knobs 184b, such that the second knobs 184b prevent the second bracket adaptor 148b from moving further downward through the channel 182b with respect to the faceplate 122. A spring may be positioned on and about the rod 180 of the bracket adaptor 148b. The second mounting bracket 136b is positioned so that the rod 180 of the bracket adaptor 148b extends through its aperture 170 and the second mounting bracket 136b is then fastened to the rear surface of the faceplate 122 by positioning bolts through the apertures 138b and screwing the bolts into the screw bosses 142, thereby trapping the bracket adaptor 148b between the faceplate 122, its knobs 184b, and the mounting bracket 136b.

The faceplate 122 and the other components of the water bottle filling station 100 coupled thereto, including the bracket adaptors 148a, 148b, mounting brackets 136a, 136b, and brackets 116, 118, are then lifted into position above the water cooler 102, such that the rear surface of the faceplate 122 faces the wall 104 and the upper portions of the rearward-facing edges 162 of the arms 164 engage and mate with the forward-facing front surfaces of the central walls 178 of the respective bracket adaptors 148a or 148b. The faceplate 122 is then pushed toward the wall 104 until the rear surface of the faceplate 122 is either flush or nearly flush against the wall 104.

As the faceplate 122 and other components are positioned in this manner, the force of gravity acting on the bracket adaptors 148a, 148b, and the forces exerted by the springs, if any are used, initially bias the bracket adaptors 148a, 148b downward and away from the flanges 168 of the mounting brackets 136a, 136b and into contact with the respective knobs 184a, 184b. As the weight of the other components of the water bottle filling station 100 is transferred to the wall mounting bracket 144, however, the bracket adaptors 148a, 148b are urged upward with respect to other components of the water bottle filling station too, against their own weight and against the forces exerted by the springs, if any are used, and toward the flanges 168 of the mounting brackets 136a, 136b.

The arms 164 of the wall mounting bracket 144 then engage with the respective bracket adaptors 148a, 148b, which act as wedges, to hold the rest of the water bottle filling station 100 both up in the air and against the wall 104. Nevertheless, the engagement of the arms 164 with the respective bracket adaptors 148a, 148b, and of the bracket adaptors 148a, 148b with the respective mounting brackets 136a, 136b through the springs, if any are used, allows some movement of the rest of the water bottle filling station 100 with respect to the wall mounting bracket 144. Such movement can include translation left-to-right, up-and-down, or front-and-back, as well as rotation about left-to-right, up-and-down, or front-and-back axes with respect to the wall mounting bracket 144. Thus, the systems and methods described herein can be said to provide a water bottle filling station that "floats" or that is "self-adjusting" on the wall mounting bracket 144.

Figure 16:
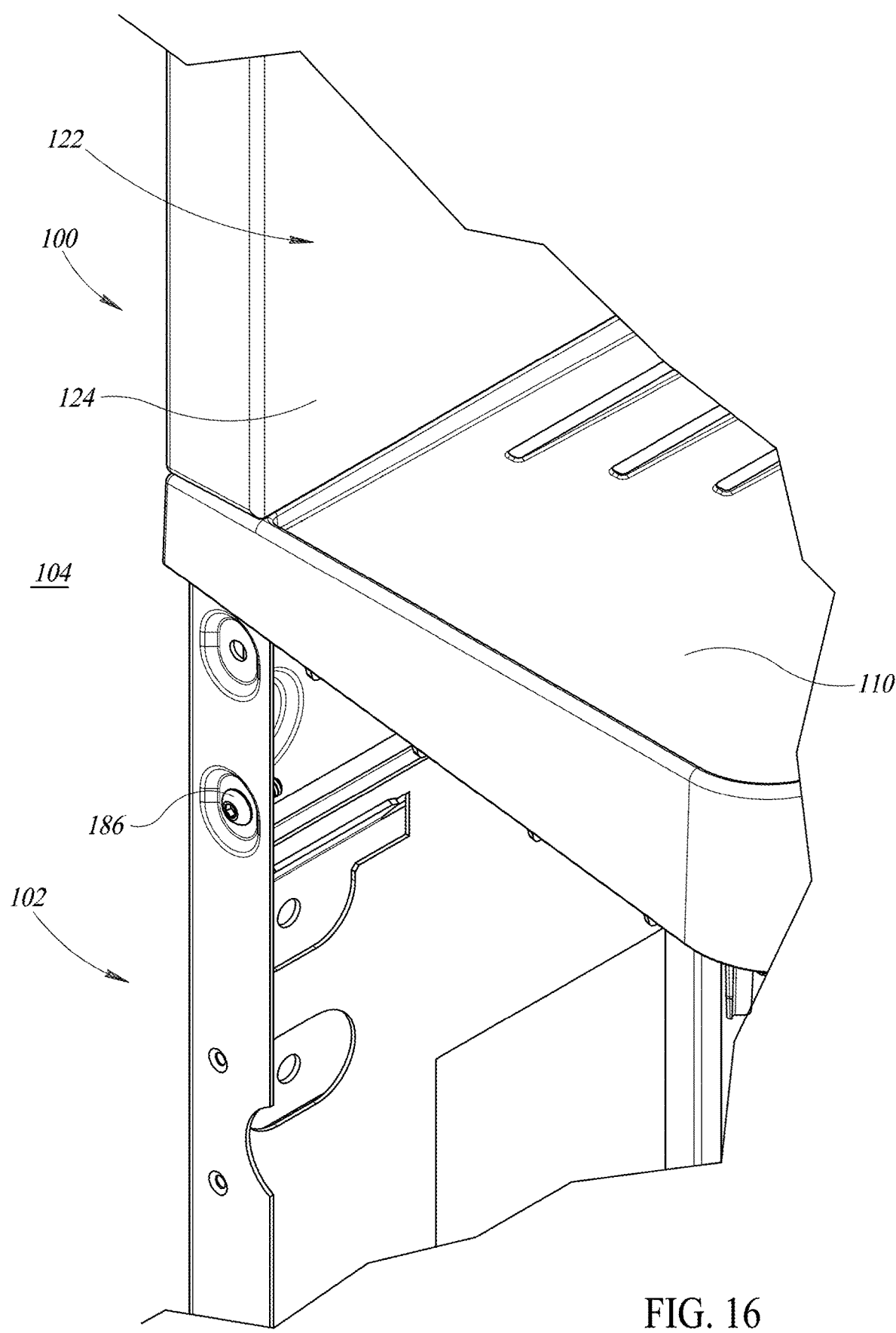
FIG. 16 is an external perspective view of a portion of the water cooler of FIG. 1 with a skirt thereof removed to illustrate other components more clearly, according to at least one illustrated implementation.
Figure 17:
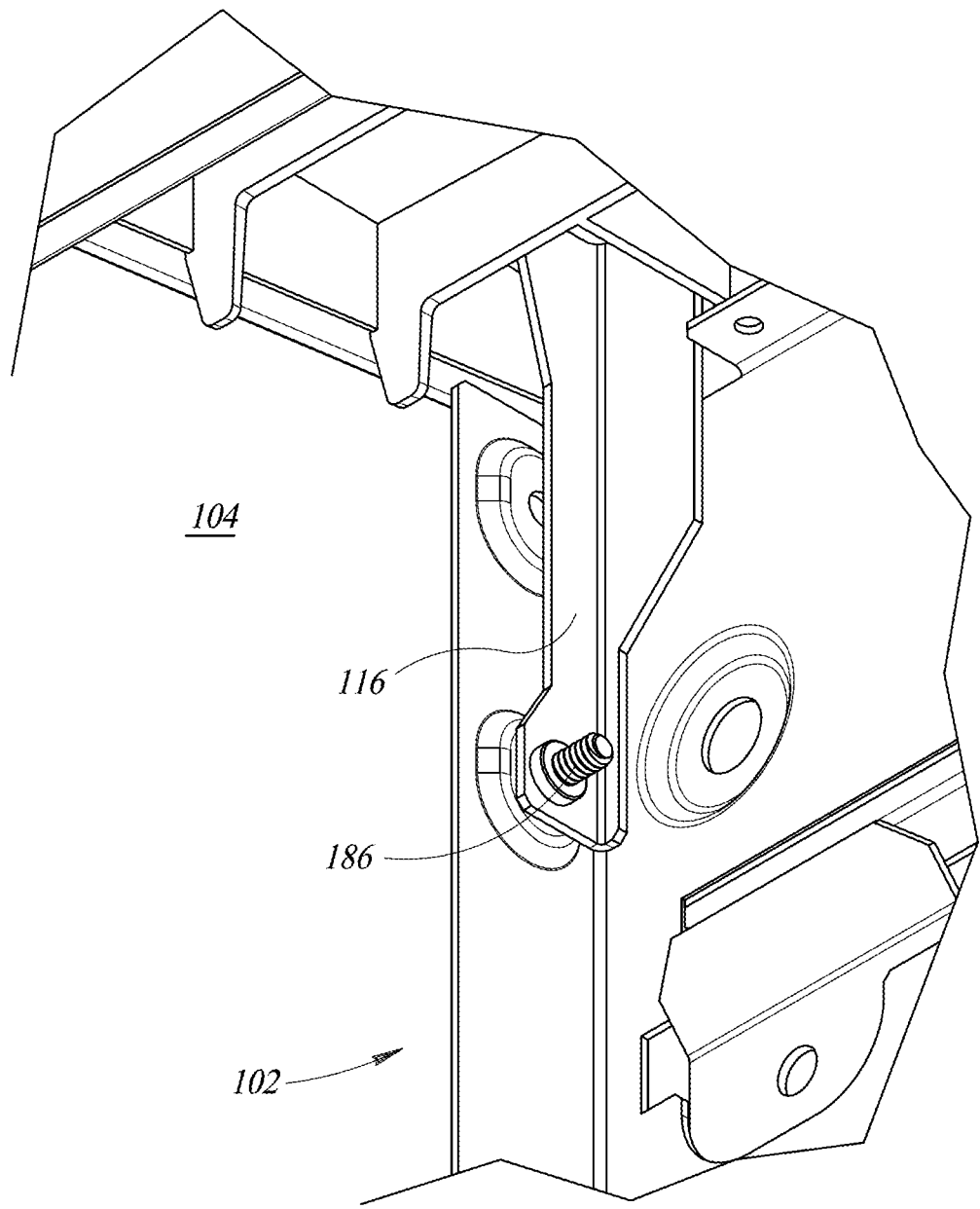
FIG. 17 is an internal perspective view of a portion of the water cooler of FIG. 1 with the skirt thereof removed to illustrate other components more clearly, according to at least one illustrated implementation.

The position and orientation of the faceplate 122 and other components rigidly coupled thereto can therefore then be adjusted, such as manually adjusted, until the bottom end of the pipe 130 is properly positioned within the water cooler 102 and until the bottom ends of the brackets 116 and 118 are properly positioned within the water cooler 102. The pipe 130 can then be coupled to a source of cooled water within the water cooler 102 and the brackets 116 and 118 can then be fastened to a frame of the water cooler 102, such as by bolts 186, as illustrated in FIGS. 16 and 17, to secure the faceplate 122 and other components of the water bottle filling station 100, including the mounting brackets 116, 118, to the water cooler 102. The skirt 108 of the water cooler 102 can then be installed on the water cooler 102 to cover the bolts 186 and other internal components of the water cooler 102.

In some implementations, the installation of the water bottle filling station 100 can therefore be completed without any fasteners, such as screws, nails, rivets, bolts, etc., or bosses or covers for such fasteners, being visible from the exterior of the completed water bottle filling station 100. In other implementations, however, once the water bottle filling station 100 is secured to the water cooler 102 as described above, additional mechanical fasteners, such as screws, nails, rivets, bolts, etc., are used to further secure the water bottle filling station 100 to the wall 104 and/or to the water cooler 102, to constrain the movement, including translation and rotation, of the water bottle filling station 100, as well as to prevent the water bottle filling station being removed from the wall 104.

While the present disclosure describes the bracket assembly being used to mount a water bottle filling station to a wall, the bracket assemblies described herein can be used to mount any object, such as a drinking fountain, a piece of art, a mirror, a television, or a shelf or a set of shelves, to a vertical wall or any other vertical surface. In such implementations, such objects can be provided with the features described herein for the faceplate 122 of the water bottle filling station 100, and can perform the same functions as described herein for the faceplate 122. If such an object is vandalized after being installed on a wall with the bracket assembly described herein, for example, such that the wall mounting bracket 144 is damaged or falls out of proper alignment, then the object can simply be re-set on the wall mounting bracket 144 without the need to remove the object from the wall, repair or replace the wall mounting bracket 144, and then re-install the object. In some cases, the features described herein can be used to re-set an object on a wall if the arms 164 of the mounting bracket 144 are separated from the wall 104 by up to, e.g., 1/8", 1/4", 3/8", 1/2", 5/8", 3/4", 7/8", or 1" (or, SI equivalent dimensions).

The present disclosure describes a bracket assembly including a wall mounting bracket 144 with arms 164 extending upward to engage with respective bracket adaptors 148a, 148b, and the bracket adaptors 148a, 148b including rods 180 and coil spring(s) 150 that extend upward to engage with first and second water bottle filling station-mounted mounting brackets 136a, 136b. In alternative implementations and embodiments, however, the bracket assembly can include first and second water bottle filling station-mounted mounting brackets with arms extending downward to engage with respective bracket adaptors, and the bracket adaptors include rods and coil spring(s) that extend downward to engage with a wall mounting bracket. Such an alternative implementation can include the same or similar features as those described herein for the water bottle filling station 100, with some of its features oriented upside-down with respect to those described herein for the water bottle filling station 100.

The components, steps, features, objects, benefits, and advantages that have been discussed are merely illustrative. None of them, or the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

For non-limiting examples: while certain embodiments are described previously in the context of an adjustable bracket adaptor mounted to a (the) fixture, the adjustable bracket adaptor can be mounted to a (the) wall or other surface in other embodiments. For further example, while use of one or more coil springs have been described above, other functional equivalent bias members, or bias means, can be used instead or addition to coil springs, e.g., leaf springs, torsion springs, extension springs, bow (simple) springs, cantilever springs, elastomeric elements, fluid-containing elements/enclosures (where a fluid can be any gas, gas mixture, or any liquid or mixture of liquids, or mixtures of gas and liquid), and the like. In further embodiments, a bracket, e.g., the second bracket, can be integrated into a (the) fixture. Moreover, in further embodiments, one or more interfaces between a bracket, e.g., a first bracket, and a bracket adaptor can have a geometry other than angled, e.g., stepped, tongue-in-groove, saw-toothed, curved, and the like.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by an "a" or "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

What is claimed is:

1. A bracket assembly for mounting an object on a wall, the bracket assembly comprising:
   a wall mounting bracket configured to be rigidly secured to the wall, wherein the wall mounting bracket includes a horizontally-extending panel and a first arm that extends vertically above the panel, and wherein the first arm includes a rearward-facing edge that extends upward and forward at a first oblique angle to vertical;
   a first bracket adaptor mechanically configured to be coupled to the object such that the first bracket adaptor can translate with respect to the object, the first bracket adaptor configured to engage with the wall mounting bracket to secure the object to the wall and allow the object to move with respect to the wall mounting bracket, wherein the first bracket adaptor includes a forward-facing front surface that extends upward and forward at a second oblique angle to vertical; and
   a first mounting bracket configured to be rigidly secured to the object;
   wherein the first bracket adaptor is mechanically coupled to the first mounting bracket such that the first bracket adaptor can translate with respect to the first mounting bracket, and the first bracket adaptor is configured to engage with the wall mounting bracket to allow the first mounting bracket to move with respect to the wall mounting bracket; and
   wherein the first oblique angle matches the second oblique angle, and wherein the forward-facing front surface of the first bracket adaptor engages with the rearward-facing edge of the first arm of the wall mounting bracket when the wall mounting bracket is engaged with the first bracket adaptor.

2. The bracket assembly of claim 1 wherein the object is a water bottle filling station.

3. The bracket assembly of claim 1, further comprising:
   a coil spring having a first end engaged with a surface of the first bracket adaptor and a second end engaged with a surface of the first mounting bracket.

4. The bracket assembly of claim 3, wherein the first mounting bracket includes an aperture and the first bracket adaptor includes a rod that extends through the aperture.

5. The bracket assembly of claim 4 wherein the coil spring extends about the rod.

6. The bracket assembly of claim 1, further comprising:
   a second mounting bracket configured to be rigidly secured to the object; and
   a second bracket adaptor mechanically configured to be coupled to the object such that the second bracket adaptor can translate with respect to the object, the second bracket adaptor configured to engage with the wall mounting bracket to secure the object to the wall and allow the object to move with respect to the wall mounting bracket, wherein the second bracket adaptor includes a forward-facing front surface that extends upward and forward at a second oblique angle to vertical;

wherein the wall mounting bracket further comprises a second arm that extends vertically above the panel, and wherein the second arm includes a rearward-facing edge that extends upward and forward at the first oblique angle to vertical;

wherein the second bracket adaptor is mechanically coupled to the second mounting bracket such that the second bracket adaptor can translate with respect to the second mounting bracket, and the second bracket adaptor is configured to engage with the second mounting bracket to allow the second mounting bracket to move with respect to the wall mounting bracket.

7. The bracket assembly of claim 6, wherein the forward-facing front surface of the second bracket adaptor engages with the rearward-facing edge of the second arm of the wall mounting bracket when the wall mounting bracket is engaged with the second bracket adaptor.

* * * * *

UNITED STATES PATENT AND TRADEMARK OFFICE
CERTIFICATE OF CORRECTION

PATENT NO. : 10,934,694 B1
APPLICATION NO. : 16/374884
DATED : March 2, 2021
INVENTOR(S) : Dean Porter et al.

Page 1 of 2

It is certified that error appears in the above-identified patent and that said Letters Patent is hereby corrected as shown below:

In the Specification

Column 3, Line 67:
"portion 114 of the upper surface 11 is configured to engage"
Should read:
--portion 114 of the upper surface 110 is configured to engage--

Column 4, Line 7:
"rear, left corner of its upper surface no and a second"
Should read:
--rear, left corner of its upper surface 110 and a second--

Column 8, Line 18:
"e.g., 1.0°, 2.0°, 3.0, 4.0°, 5.0°, 6.0°, 7.0°, 8.0°, 9.0°, 10.0°"
Should read:
--e.g., 1.0°, 2.0°, 3.0°, 4.0°, 5.0°, 6.0°, 7.0°, 8.0°, 9.0°, 10.0°--

Column 8, Line 22:
"extending left-to-right, up to, e.g., 1.0°, 2.0°, 3.0°, 4.0°, 5.0,"
Should read:
--extending left-to-right, up to, e.g., 1.0°, 2.0°, 3.0°, 4.0°, 5.0°,--

Column 8, Line 27:
"to, e.g., 1.0°, 2.0°, 3.0°, 4.0°, 5.0°, 6.0°, 7.0°, 8.0°, 9.0,"
Should read:
--to, e.g., 1.0°, 2.0°, 3.0°, 4.0°, 5.0°, 6.0°, 7.0°, 8.0°, 9.0°,--

Signed and Sealed this
Twenty-fourth Day of June, 2025

Coke Morgan Stewart
*Acting Director of the United States Patent and Trademark Office*

CERTIFICATE OF CORRECTION (continued)
U.S. Pat. No. 10,934,694 B1

Column 9, Line 31:
"the water bottle filling station too, against their own weight"
Should read:
--the water bottle filling station 100, against their own weight--

Column 11, Line 51:
"element proceeded by an "a" or "an" does not, without"
Should read:
--element proceeded by an "a" or an "an" does not, without--